US011559123B1

(12) United States Patent
Brown et al.

(10) Patent No.: US 11,559,123 B1
(45) Date of Patent: Jan. 24, 2023

(54) MUSICAL GIFT BOX

(71) Applicants: Glenford Brown, N Brunswick, NJ (US); Donna Brown, N Brunswick, NJ (US)

(72) Inventors: Glenford Brown, N Brunswick, NJ (US); Donna Brown, N Brunswick, NJ (US)

( * ) Notice: Subject to any disclaimer, the term of this patent is extended or adjusted under 35 U.S.C. 154(b) by 0 days.

(21) Appl. No.: 17/189,370

(22) Filed: Mar. 2, 2021

(51) Int. Cl.
| | |
|---|---|
| *H04R 1/02* | (2006.01) |
| *A45C 11/16* | (2006.01) |
| *H04W 76/10* | (2018.01) |
| *G06F 3/16* | (2006.01) |
| *A45C 15/00* | (2006.01) |
| *H02J 7/00* | (2006.01) |
| *H04R 3/00* | (2006.01) |

(52) U.S. Cl.
CPC .............. *A45C 11/16* (2013.01); *A45C 15/00* (2013.01); *G06F 3/162* (2013.01); *G06F 3/165* (2013.01); *H02J 7/0045* (2013.01); *H04R 1/025* (2013.01); *H04R 3/00* (2013.01); *H04W 76/10* (2018.02); *H04R 2420/07* (2013.01)

(58) Field of Classification Search
CPC .......... H04R 1/025; H04R 3/00; H04R 1/028; H04R 1/1041; H04R 5/023
USPC .......................................... 381/332–334, 122
See application file for complete search history.

(56) References Cited

U.S. PATENT DOCUMENTS

| | | | |
|---|---|---|---|
| D254,720 S | 4/1980 | Schuander | |
| 4,857,029 A * | 8/1989 | Dierick | A63H 37/00 206/583 |
| 5,056,660 A | 10/1991 | Huang | |
| 5,329,433 A | 7/1994 | Geeting | |
| 5,980,062 A | 11/1999 | Bell | |
| 6,523,285 B1 | 2/2003 | Gilson | |
| 9,624,014 B2 | 4/2017 | Marsh | |
| 9,661,409 B2 * | 5/2017 | Leach | H04R 1/028 |
| 11,128,973 B2 * | 9/2021 | Gerrard | H03G 5/005 |
| 2010/0287799 A1 * | 11/2010 | Clegg | B42D 15/022 40/124.02 |
| 2011/0210160 A1 * | 9/2011 | Vantieghem | G11B 20/10 281/21.1 |
| 2012/0031255 A1 | 2/2012 | Stites | |
| 2013/0177291 A1 * | 7/2013 | Clegg | B42D 15/022 386/230 |
| 2017/0296936 A1 * | 10/2017 | Moffett, Jr. | A63H 37/00 |
| 2021/0144478 A1 * | 5/2021 | DeCastro | H04W 4/029 |

* cited by examiner

FOREIGN PATENT DOCUMENTS

GB        2366240        10/2004

*Primary Examiner* — Disler Paul

(57) ABSTRACT

The musical gift box is a container uses to store jewelry. The musical gift box rotates between a closed position and an open position. The musical gift box incorporates a jewelry box, a control circuit, and a personal data device. The jewelry box contains the control circuit. The control circuit forms a wireless communication link with the personal data device. The jewelry box is a rotating structure. The jewelry box contains the jewelry. The jewelry box rotates between the closed position and the open position. The control circuit detects when the jewelry box is in the closed position. When the jewelry box rotates towards the open position, the control circuit: a) establishes the wireless communication link with the personal data device; b) receives a transmission from the personal data device containing a music file; and, c) converts the music file into an audible sound commonly referred to as music.

17 Claims, 5 Drawing Sheets

MUSICAL GIFT BOX

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transport and packaging including containers for storage, more specifically, a detail of a container. (B65D5/42)

SUMMARY OF INVENTION

The musical gift box is a container uses to store jewelry. The musical gift box rotates between a closed position and an open position. The musical gift box comprises a jewelry box, a control circuit, and a personal data device. The jewelry box contains the control circuit. The control circuit forms a wireless communication link with the personal data device. The jewelry box is a rotating structure. The jewelry box contains the jewelry. The jewelry box rotates between the closed position and the open position. The control circuit detects when the jewelry box is in the closed position. When the jewelry box rotates towards the open position, the control circuit: a) establishes the wireless communication link with the personal data device; b) receives a transmission from the personal data device containing a music file; and, c) converts the music file into an audible sound commonly referred to as music.

These together with additional objects, features and advantages of the musical gift box will be readily apparent to those of ordinary skill in the art upon reading the following detailed description of the presently preferred, but nonetheless illustrative, embodiments when taken in conjunction with the accompanying drawings.

In this respect, before explaining the current embodiments of the musical gift box in detail, it is to be understood that the musical gift box is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the musical gift box.

It is therefore important that the claims be regarded as including such equivalent construction insofar as they do not depart from the spirit and scope of the musical gift box. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
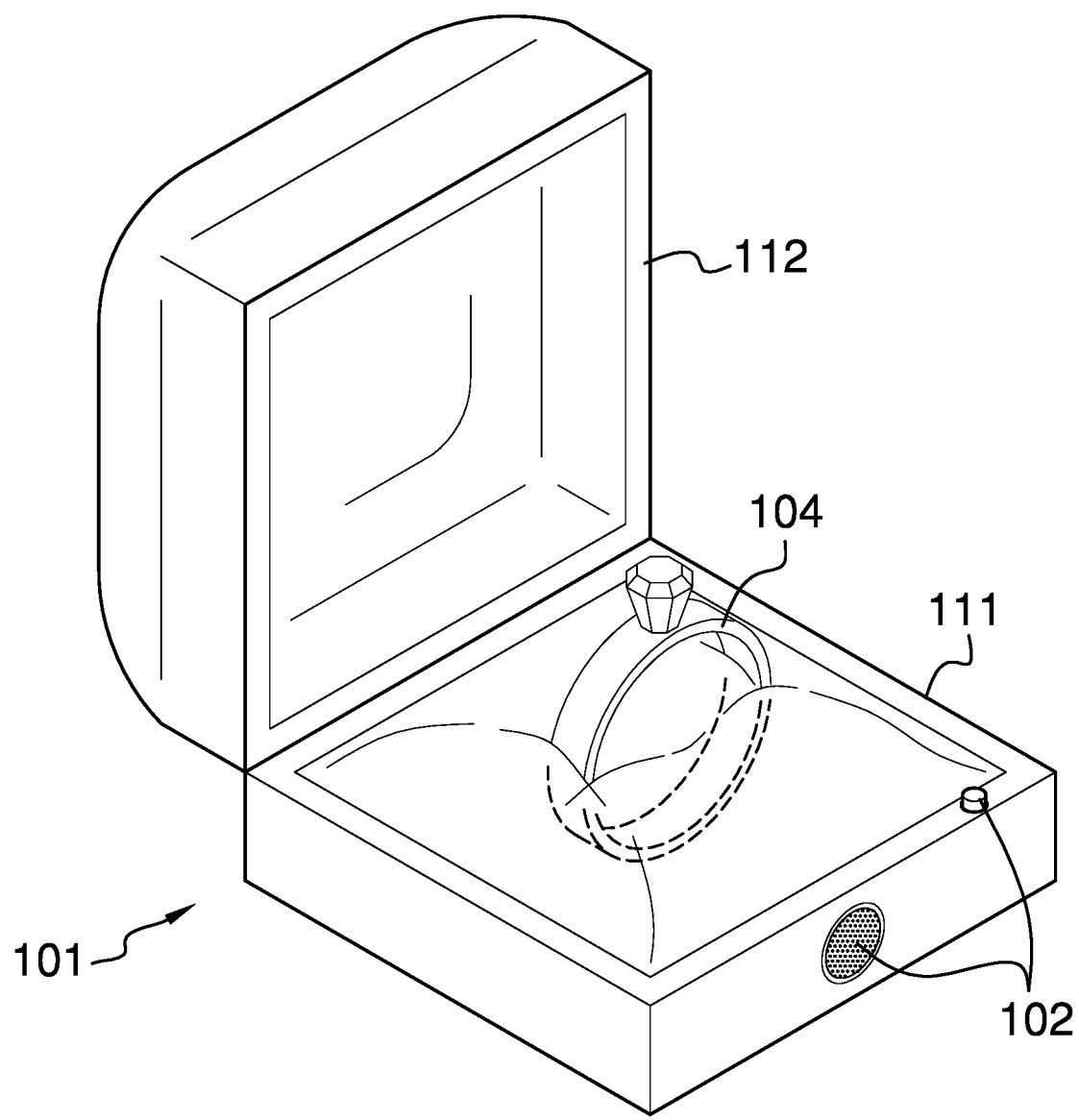
FIG. 1 is a perspective view of an embodiment of the disclosure.
Figure 2:
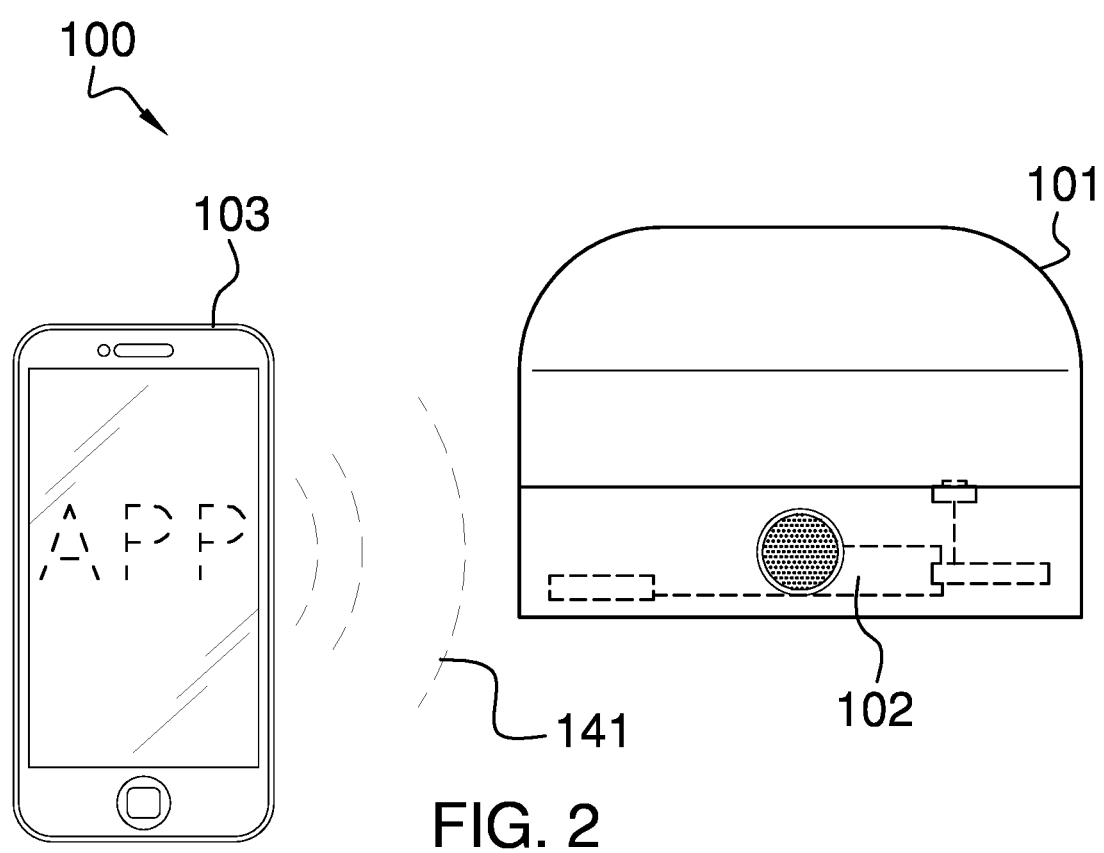
FIG. 2 is a front view of an embodiment of the disclosure.
Figure 3:
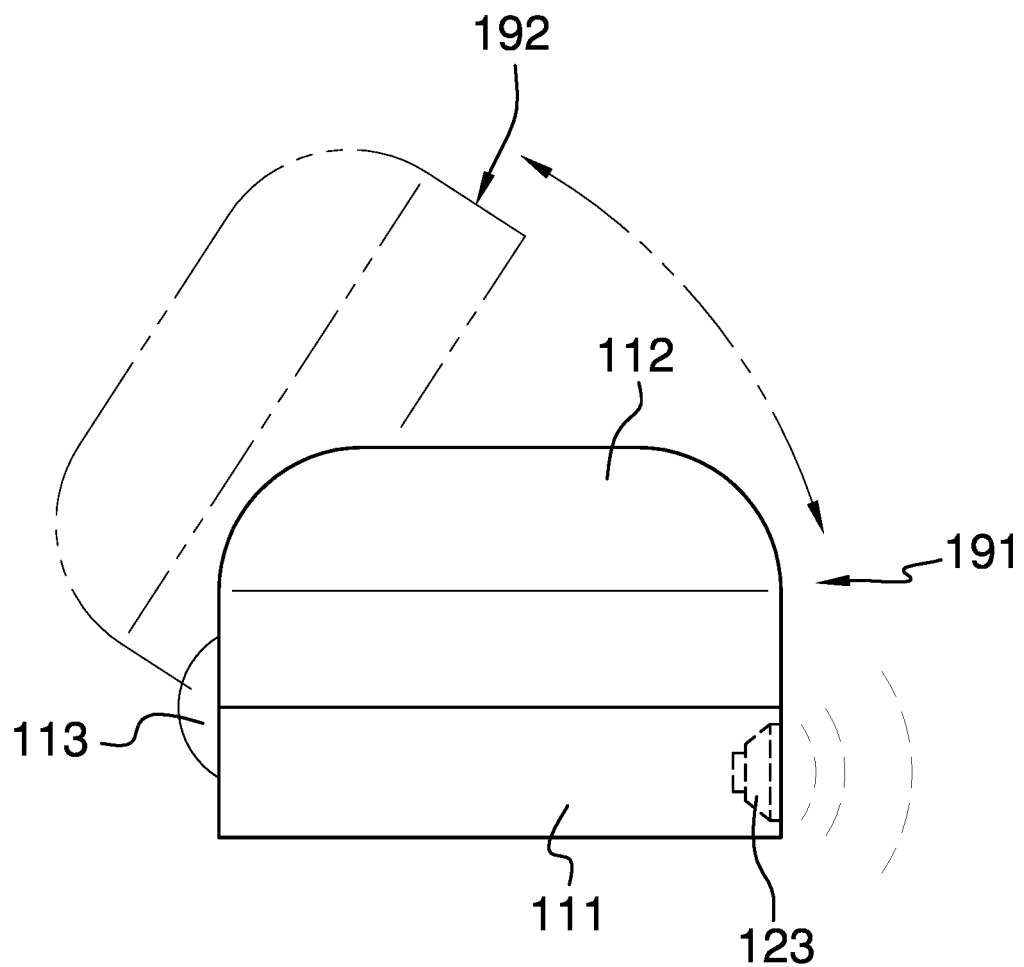
FIG. 3 is a side view of an embodiment of the disclosure.
Figure 4:
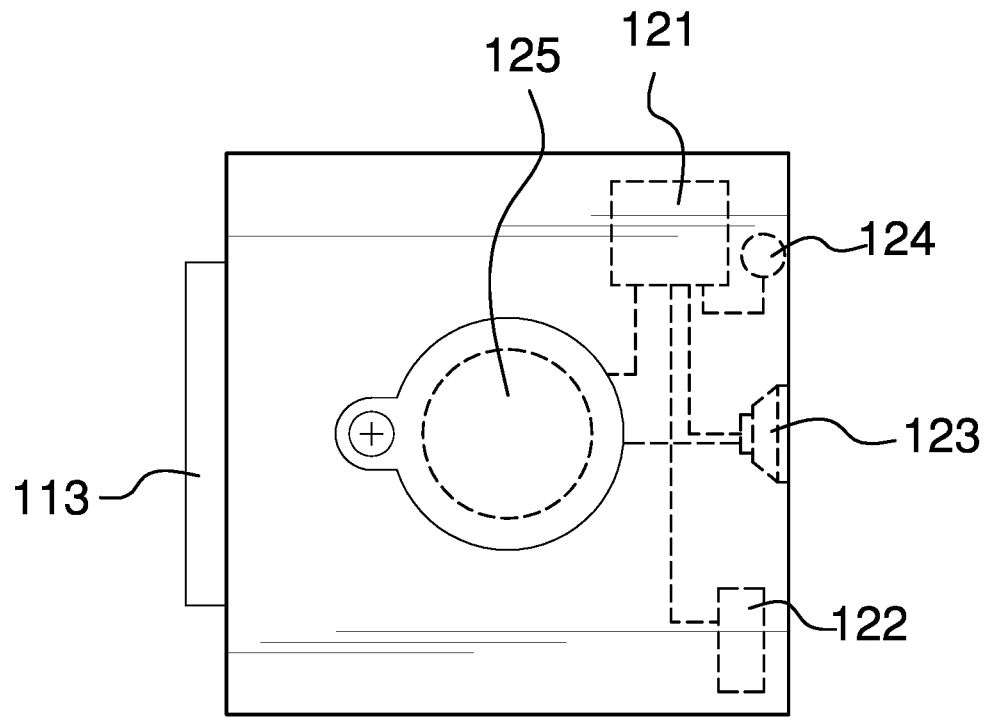
FIG. 4 is a bottom view of an embodiment of the disclosure.
Figure 5:
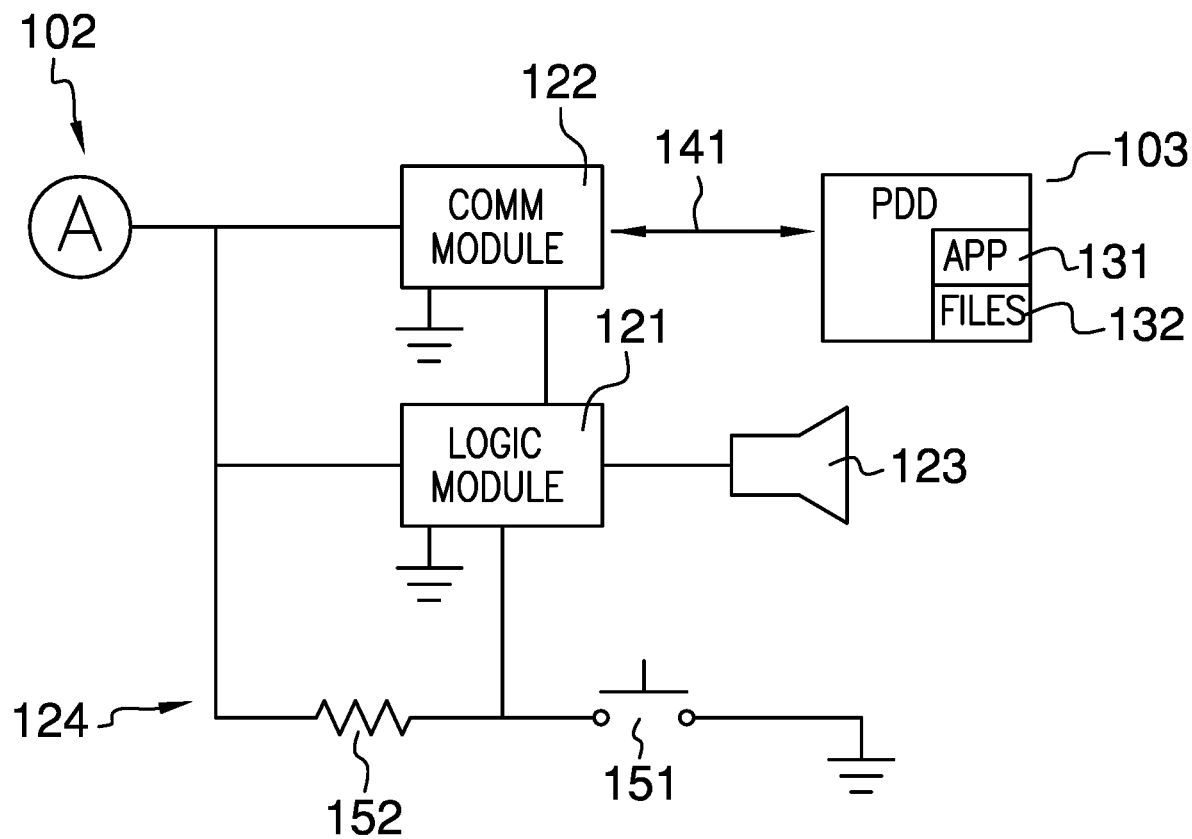
FIG. 5 is a block diagram or schematic view of an embodiment of the disclosure.
Figure 5:
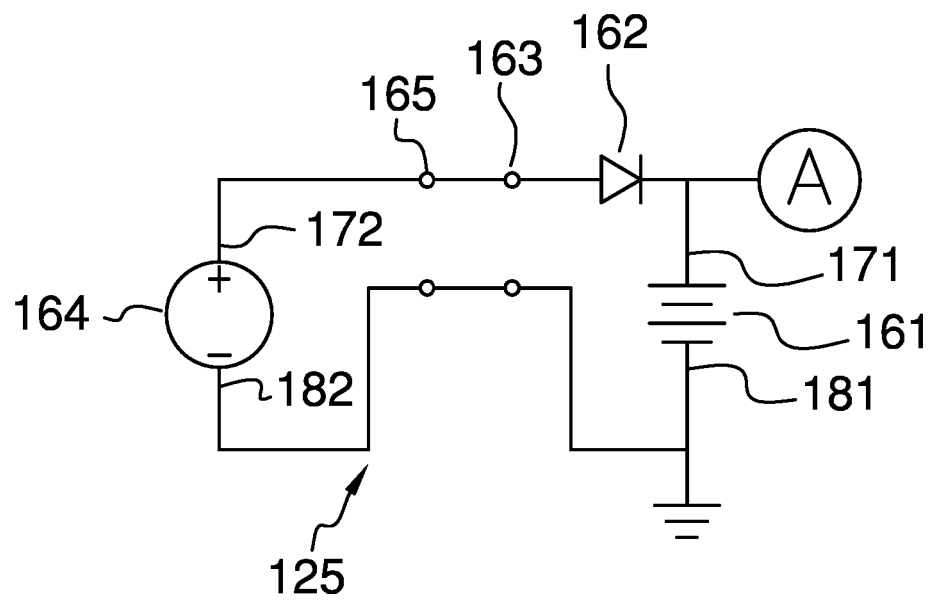

Detailed reference will now be made to one or more potential embodiments of the disclosure, which are illustrated in FIGS. 1 through 5.

The musical gift box 100 (hereinafter invention) is a container. The invention 100 is configured for use in storing jewelry 104. The invention 100 rotates between a closed position 191 and an open position 192. The closed position 191 is defined elsewhere in this disclosure. The jewelry 104 is defined elsewhere in this disclosure. The open position 192 is defined elsewhere in this disclosure.

The invention 100 comprises a jewelry 104 box 101, a control circuit 102, and a personal data device 103. The jewelry 104 box 101 contains the control circuit 102. The control circuit 102 forms a wireless communication link 141 with the personal data device 103. The jewelry 104 box 101 is a rotating structure. The jewelry 104 box 101 contains the jewelry 104. The jewelry 104 box 101 rotates between the closed position 191 and the open position 192. The control circuit 102 detects when the jewelry 104 box 101 is in the closed position 191. When the jewelry 104 box 101 rotates towards the open position 192, the control circuit 102: a) establishes the wireless communication link 141 with the personal data device 103; b) receives a transmission from the personal data device 103 containing a music file 132; and, c) converts the music file 132 into an audible sound commonly referred to as music.

The jewelry 104 box 101 is a containment structure. The jewelry 104 box 101 is configured for use in storing jewelry 104. The jewelry 104 box 101 is a rotating structure. The jewelry 104 box 101 rotates between the closed position 191 and the open position 192. The rotation of the jewelry 104 box 101 from the closed position 191 to the open position 192 initiates the operation of the control circuit 102. The jewelry 104 box 101 comprises a pan 111, a lid 112, and a hinge 113.

The pan 111 is a prism-shaped structure. The pan 111 is a hollow structure. The pan 111 has a pan-shaped structure. The pan 111 forms the containment space that stores the jewelry 104.

The lid 112 is a prism-shaped structure. The lid 112 is a hollow structure. The lid 112 has a pan-shaped structure. The open face of the pan-shaped structure of the lid 112 is geometrically similar to the open face of the pan-shaped structure of the pan 111. The lid 112 attaches to the pan 111 such that the open face of the lid 112 encloses the open face of the pan 111. The lid 112 attaches to the pan 111 such that the lid 112 rotates relative to the pan 111. The lid 112 rotates between the closed position 191 and the open position 192.

The hinge 113 is a fastening structure that attaches the lid 112 to the pan 111. The hinge 113 is a rotating structure that allows the lid 112 to rotate relative to the pan 111.

The control circuit 102 is an electric circuit. The control circuit 102 monitors the position of the jewelry 104 box 101. The rotation of the jewelry 104 box 101 from the closed position 191 to the open position 192 initiates the operation of the control circuit 102. The control circuit 102 establishes the wireless communication link 141 between the control circuit 102 and the personal data device 103. The control circuit 102 receives a music file 132 from the personal data device 103. The control circuit 102 converts the information contained in the music file 132 into audible sounds commonly referred to as music. The control circuit 102 is an independently powered electric circuit. By independently powered is meant that the control circuit 102 can operate without an electrical connection to an external power source 164.

The control circuit 102 comprises a logic module 121, a communication module 122, a speaker 123, a switching circuit 124, and a power circuit 125. The logic module 121, the communication module 122, the speaker 123, the switching circuit 124, and the power circuit 125 are electrically interconnected.

The logic module 121 is a readily and commercially available programmable electronic device that is used to manage, regulate, and operate the control circuit 102. The communication module 122 is a wireless electronic communication device that allows the logic module 121 to wirelessly communicate with a locally presented personal data device 103. The communication module 122 further comprises a wireless communication link 141. Specifically, the communication module 122 establishes a wireless communication link 141 between the control circuit 102 and the personal data device 103. In the first potential embodiment of the disclosure, the communication module 122 supports a communication protocol selected from the group consisting of a WiFi™ protocol or a Bluetooth™ protocol.

The speaker 123 is a transducer. The speaker 123 electrically connects to the logic module 121. The logic module 121 controls the operation of the speaker 123. The logic module 121 transmits electric signals to the speaker 123. The speaker 123 converts the received electrical signals into audible sounds commonly referred to as music.

The switching circuit 124 is an electric circuit. The logic module 121 monitors the switching circuit 124 to determine when the lid 112 rotates into the open position 192. The logic module 121 initiates the operation of the control circuit 102 when the logic module 121 detects that the lid 112 is in the open position 192. The switching circuit 124 is actuated when: a) the lid 112 rotates to the closed position 191; and, b) the lid 112 rotates into the open position 192. The switching circuit 124 further comprises a switch 151 and a limit resistor 152. The switch 151 and the limit resistor 152 form a series electric connection.

The switch 151 is an electric switch. The switch 151 mechanically attaches to the lid 112 such that the rotation of the lid 112 actuates the switch 151. The logic module 121 monitors the voltage across the switch 151. The logic module 121 determines the position of the lid 112 based on the voltage across the switch 151. The limit resistor 152 is a resistive circuit element that is wired in series with the switch 151. The limit resistor 152 limits the flow of electric current through the switch 151.

The power circuit 164 is an electrical circuit. The power circuit 164 powers the operation of the control circuit 102. The power circuit 164 is an electrochemical device. The power circuit 164 converts chemical potential energy into the electrical energy required to power the control circuit 102. The power circuit 125 comprises a battery 161, a diode 162, a charging plug 163, and an external power source 164. The external power source 164 further comprises a charging plug 165, a second positive terminal 172, and a second negative terminal 182. The battery 161 further comprises a first positive terminal 171 and a first negative terminal 181. The battery 161, the diode 162, the charging plug 163, the external power source 164, and the charging plug 165 are electrically interconnected.

The battery 161 is an electrochemical device. The battery 161 converts chemical potential energy into the electrical energy used to power the control circuit 102. The battery 161 is a commercially available rechargeable battery 161. The chemical energy stored within the rechargeable battery 161 is renewed and restored through use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The diode 162 is an electrical device that allows current to flow in only one direction. The diode 162 installs between the rechargeable battery 161 and the charging port 163 such that electricity will not flow from the first positive terminal 171 of the rechargeable battery 161 into the second positive terminal 172 of the external power source 164. In the first potential embodiment of the disclosure, the external power source 164, the charging plug 165, and the charging port 163 are compatible with USB power requirements.

The personal data device 103 is a programmable electrical device. The personal data device 103 comprises an application 131 and a music file 132. The personal data device 103 provides data management and communication services through one or more functions provided through the application 131. The application 131 is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application 131 on a personal data device 103 are well known and documented in the electrical arts. The application 131 of the personal data device 103 forms an interface between the control circuit 102 and a client using the invention 100.

The application 131 of the personal data device 103 transmits a music file 132 over the wireless communication link 141 to the control circuit 102. The communication module 122 receives the transmitted music file 132 and relays the received music file 132 to the logic module 121. The logic module 121 converts the music file 132 into a series of electric signal that is used to drive the speaker 123. By driving the speaker 123 is meant that the speaker 123 generates audible sounds that reproduce the music encoded by the music file 132.

The music file 132 is an audio file. The audio file is defined elsewhere in this disclosure. The music file 132 is stored on the personal data device 103. The application 131 transmits the music file 132 to the control circuit 102. The logic module 121 uses the data contained in the music file 132 to generate the electric signals used by the speaker 123 to generate the audible sounds commonly referred to as music.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Audio File: As used in this disclosure, an audio file is a digital representation of a sound that is used to store a recording of the sound. Separate hardware is used to convert the digital representation of the sound into an audible sound.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a moving structure that is in an orientation that prevents the insertion of a first object into a second object. The closed position is often referred to as an object being "closed." Always use orientation.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Jewelry: As used in this disclosure, jewelry is a personal decorative item that is worn by a person. Examples of jewelry include, but are not limited to, necklaces, bracelets, rings, earrings, cufflinks, brooches, and wristwatches.

Lid: As used in this disclosure, a lid is a removable cover that is placed over an opening of a hollow structure to enclose the hollow structure.

Limit Resistor: As used in this disclosure, a limit resistor is an electrical resistor that is used to limit the flow of electric current through an electrical circuit.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a moving structure that is in an orientation that presents that allows the insertion of a first object into a second object. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A musical gift box comprising a jewelry box, a control circuit, and a personal data device; wherein the jewelry box contains the control circuit; wherein the control circuit forms a wireless communication link with the personal data device; wherein the jewelry box is a container; wherein the jewelry box is a rotating structure; wherein the jewelry box rotates between a closed position and an open positions; wherein the control circuit detects when the jewelry box is in the closed position; wherein when the jewelry box rotates towards the open position, the control circuit: a) establishes a wireless communication link with the personal data device; b) receives a transmission from the personal data device containing a music file; and, c) converts the music file into an audible sound; wherein the control circuit comprises a logic module, a communication module, a speaker, a switching circuit, and a power circuit; wherein the logic module, the communication module, the speaker, the switching circuit, and the power circuit are electrically interconnected; wherein the switching circuit further comprises a switch and a limit resistor; wherein the switch and the limit resistor form a series electric connection; wherein the switch is an electric switch; wherein the switch mechanically attaches to a lid such that the rotation of the lid actuates the switch; wherein the logic module monitors the voltage across the switch; wherein the logic module determines the position of the lid based on the voltage across the switch; wherein the limit resistor is a resistive circuit element that is wired in series with the switch; wherein the limit resistor limits the flow of electric current through the switch.

2. The musical gift box according to claim 1
wherein the jewelry box is a containment structure;
wherein the jewelry box contains the jewelry;
wherein the rotation of the jewelry box from the closed position to the open position initiates the operation of the control circuit.

3. The musical gift box according to claim 2
wherein the control circuit is an electric circuit;
wherein the control circuit monitors the position of the jewelry box;
wherein the rotation of the jewelry box from the closed position to the open position initiates the operation of the control circuit.

4. The musical gift box according to claim 3
wherein the control circuit establishes the wireless communication link between the control circuit and the personal data device;
wherein the control circuit receives a music file from the personal data device;
wherein the control circuit converts the information contained in the music file into audible sounds.

5. The musical gift box according to claim 4
wherein the control circuit is an independently powered electric circuit;
wherein by independently powered is meant that the control circuit can operate without an electrical connection to an external power source.

6. The musical gift box according to claim 5
wherein the jewelry box comprises a pan, a lid, and a hinge;
wherein the lid attaches to the pan such that the lid rotates relative to the pan;
wherein the lid rotates between the closed position and the open position;
wherein the hinge is a fastening structure that attaches the lid to the pan;
wherein the hinge is a rotating structure that allows the lid to rotate relative to the pan.

7. The musical gift box according to claim 6
wherein the personal data device is a programmable electrical device;
wherein the personal data device comprises an application and a music file;
wherein the personal data device provides data management and communication services through one or more functions provided through the application;
wherein the application of the personal data device forms an interface with the control circuit.

8. The musical gift box according to claim 7
wherein the pan is a hollow structure;
wherein the pan has a pan-shaped structure;
wherein the pan forms the containment space that stores the jewelry.

9. The musical gift box according to claim 8
wherein the lid is a hollow structure;
wherein the lid has a pan-shaped structure;
wherein the open face of the pan-shaped structure of the lid is geometrically similar to the open face of the pan-shaped structure of the pan;
wherein the lid attaches to the pan such that the open face of the lid encloses the open face of the pan.

10. The musical gift box according to claim 9
wherein the logic module is a programmable electronic device;
wherein the communication module is a wireless electronic communication device that allows the logic module to wirelessly communicate with the personal data device;
wherein the communication module further comprises a wireless communication link;
wherein the communication module establishes the wireless communication link between the control circuit and the personal data device.

11. The musical gift box according to claim 10
wherein the speaker is a transducer;
wherein the speaker electrically connects to the logic module;
wherein the logic module controls the operation of the speaker;
wherein the logic module transmits electric signals to the speaker;
wherein the speaker converts the received electrical signals into audible sounds.

12. The musical gift box according to claim 11
wherein the switching circuit is an electric circuit;
wherein the logic module monitors the switching circuit to determine when the lid rotates into the open position;
wherein the logic module initiates the operation of the control circuit when the logic module detects that the lid is in the open position;
wherein the switching circuit is actuated when: a) the lid rotates to the closed position; and, b) the lid rotates into the open position.

13. The musical gift box according to claim 12
wherein the power circuit is an electrical circuit;
wherein the power circuit powers the operation of the control circuit;
wherein the power circuit is an electrochemical device;
wherein the power circuit converts chemical potential energy into the electrical energy required to power the control circuit.

14. The musical gift box according to claim 13
wherein the power circuit comprises a battery, a diode, a charging plug, and an external power source;
wherein the external power source further comprises a charging plug, a second positive terminal, and a second negative terminal;
wherein the battery further comprises a first positive terminal and a first negative terminal;
wherein the battery, the diode, the charging plug, the external power source, and the charging plug are electrically interconnected.

15. The musical gift box according to claim 14
wherein the battery is a rechargeable battery;
wherein the charging port is an electrical circuit that reverses the polarity of the rechargeable battery;
wherein the charging port forms an electrical connection to an external power source using a charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

16. The musical gift box according to claim 15
wherein the application of the personal data device transmits a music file over the wireless communication link to the control circuit;
wherein the communication module receives the transmitted music file and relays the received music file to the logic module;
wherein the logic module converts the music file into a series of electric signal that is used to drive the speaker;
wherein by driving the speaker is meant that the speaker generates audible sounds that reproduce the music encoded by the music file.

17. The musical gift box according to claim 16
wherein the music file is an audio file;
wherein the music file is stored on the personal data device;
wherein the application transmits the music file to the control circuit;
wherein the logic module uses the data contained in the music file to generate the electric signals used by the speaker to generate the audible sounds.

\* \* \* \* \*